United States Patent
Wakayama

(10) Patent No.: US 12,014,470 B2
(45) Date of Patent: Jun. 18, 2024

(54) MODEL GENERATION APPARATUS, MODEL GENERATION SYSTEM, MODEL GENERATION METHOD

(71) Applicant: NEC Corporation, Tokyo (JP)

(72) Inventor: Hisaya Wakayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 156 days.

(21) Appl. No.: 17/610,518

(22) PCT Filed: May 22, 2019

(86) PCT No.: PCT/JP2019/020307
§ 371 (c)(1),
(2) Date: Nov. 11, 2021

(87) PCT Pub. No.: WO2020/235057
PCT Pub. Date: Nov. 26, 2020

(65) Prior Publication Data
US 2022/0215641 A1    Jul. 7, 2022

(51) Int. Cl.
*G06T 19/20* (2011.01)
*G06T 17/00* (2006.01)

(52) U.S. Cl.
CPC .............. *G06T 19/20* (2013.01); *G06T 17/00* (2013.01); *G06T 2200/04* (2013.01);
(Continued)

(58) Field of Classification Search
None
See application file for complete search history.

(56) References Cited

U.S. PATENT DOCUMENTS

2015/0009214 A1* 1/2015 Lee .................. G06T 17/10
345/420
2016/0071318 A1* 3/2016 Lee .................. G06V 20/653
345/419
(Continued)

FOREIGN PATENT DOCUMENTS

JP     2000-509150 A    7/2000
JP     2017-120648 A    7/2017
(Continued)

OTHER PUBLICATIONS

International Search Report for PCT Application No. PCT/JP2019/020307, dated Aug. 13, 2019.

*Primary Examiner* — Kee M Tung
*Assistant Examiner* — Jed-Justin Imperial

(57) ABSTRACT

An object is to provide a model generation apparatus capable of generating a model for implementing a more precise simulation. Firstly, an object to be reconstructed on a 3D model is extracted from 3D image information, and an object model having a highest shape conformity degree with the object is acquired from among a plurality of object models available on the 3D model, and is associated with size information and disposed-place information of the object. Next, for each of acquired object models, the extracted object model is edited so as to conform with the size information of the object. Then, the edited object model is disposed on the 3D model so that the object model satisfies a physical constraint on the 3D model and conforms with the disposed-place information.

9 Claims, 14 Drawing Sheets

(52) U.S. Cl.
CPC .. *G06T 2210/56* (2013.01); *G06T 2219/2004* (2013.01); *G06T 2219/2016* (2013.01); *G06T 2219/2021* (2013.01)

(56) References Cited

U.S. PATENT DOCUMENTS

| | | | |
|---|---|---|---|
| 2018/0075648 A1* | 3/2018 | Moghadam | G06T 17/10 |
| 2019/0156582 A1* | 5/2019 | Yankovich | G06Q 30/0633 |
| 2019/0377358 A1* | 12/2019 | Zapolsky | G06T 19/006 |

FOREIGN PATENT DOCUMENTS

| | | |
|---|---|---|
| JP | 2019-003621 A | 1/2019 |
| WO | 2017/017790 A1 | 2/2017 |

\* cited by examiner

| MODEL NAME | OBJECT MODEL INFORMATION |
|---|---|
| TABLE | /home/user/3dmodel/table.dae |
| CHAIR | /home/user/3dmodel/chair.dae |
| SHELF | /home/user/3dmodel/shelf.dae |
| LUGGAGE | /home/user/3dmodel/baggage.dae |
| WALL | /home/user/3dmodel/wall.dae |
| ... | ... |

Fig. 3

| ID | MODEL NAME | OBJECT MODEL INFORMATION | SIZE INFORMATION (UNIT: m) | MAGNIFICATION RATIO | DISPOSITION INFORMATION (UNIT: m (1th to 3rd ITEMS), rad (4th to 6th ITEMS)) |
|---|---|---|---|---|---|
| 1 | DESK | /home/user/3dmodel/table.dae | (1.0, 0.5, 0.4) | (1, 1, 0.4) | (0, 0, 0.2, 0, 0, 0) |
| 2 | LUGGAGE | /home/user/3dmodel/baggage.dae | (0.15, 0.2, 0.1) | (0.75, 1, 0.5) | (0.1, 0.07, 0.4, 0, 0, 1.57) |
| 3 | SHELF | /home/user/3dmodel/shelf.dae | (1.0, 0.5, 2.0) | (1, 1.2, 1) | (0, 0.3, 1, 0, 0, 0) |

Fig. 7

| ID | MODEL NAME | OBJECT MODEL INFORMATION | SIZE INFORMATION (UNIT: m) | DISPOSITION INFORMATION (UNIT: m (1th to 3rd ITEMS), rad (4th to 6th ITEMS)) |
|---|---|---|---|---|
| 1 | DESK | /home/user/3dmodel/table.dae | (1.0, 0.5, 0.4) | (0, 0, 0.2, 0, 0, 0) |
| 2 | LUGGAGE | /home/user/3dmodel/baggage.dae | (0.15, 0.2, 0.1) | (0.1, 0.07, 0.4, 0, 0, 1.57) |
| 3 | SHELF | /home/user/3dmodel/shelf.dae | (1.0, 0.5, 2.0) | (0, 0.3, 1, 0, 0, 0) |

Fig. 8

| MODEL NAME | MASS (UNIT: kg) | PARTS | PARTS MASS (UNIT: kg) | STATIC FRICTION COEFFICIENT | DYNAMIC FRICTION COEFFICIENT |
|---|---|---|---|---|---|
| DESK | 5.5 | TOP BOARD | 4.5 (WIDTH/DEPTH) | 0.50 | 0.47 |
|  |  | LEG | 1.0 (HEIGHT) | 0.78 | 0.71 |
| CHAIR | 0.8 | TOP BOARD | 0.35 (WIDTH/DEPTH) | 0.50 | 0.47 |
|  |  | REAR SURFACE | 0.25 (WIDTH/HEIGHT) | 0.50 | 0.47 |
|  |  | LEG | 0.2 (HEIGHT) | 0.78 | 0.71 |
| SHELF | 15 | SHELF BOARD | – | 0.50 | 0.47 |
|  |  | LEG | – | 0.50 | 0.47 |
| LUGGAGE | 0.2 | BOTTOM SURFACE · SIDE SURFACE | – | 0.38 | 0.35 |
| WALL | – | WALL SURFACE | – | 0.50 | 0.47 |
| ... | ... | ... | ... | ... | ... |

Fig. 11

| MODEL NAME | OBJECT MODEL INFORMATION | LOWER PART DISPOSITION CONSTRAINT |
|---|---|---|
| DESK | /home/user/3dmodel/table.dae | (base) |
| CHAIR | /home/user/3dmodel/chair.dae | (base) |
| SHELF | /home/user/3dmodel/shelf.dae | (base) |
| LUGGAGE | /home/user/3dmodel/baggage.dae | (base), TABLE, CHAIR, SHELF, LUGGAGE |
| WALL | /home/user/3dmodel/wall.dae | (base) |
| ... | ... | |

Fig. 14

MODEL GENERATION APPARATUS, MODEL GENERATION SYSTEM, MODEL GENERATION METHOD

This application is a National Stage Entry of PCT/JP2019/020307 filed on May 22, 2019, the contents of all of which are incorporated herein by reference, in their entirety.

TECHNICAL FIELD

The present disclosure relates to a model generation apparatus, a model generation system, a model generation method, and a program.

BACKGROUND ART

As a type of the technologies that link the real world with an information space, such as Virtual Reality (VR) and Augmented Reality (AR), several technologies for reproducing environmental information in the real world on a 3D (3-Dimension) model have been known.

Patent Literature 1 discloses a technology for recognizing a geometric shape from point-cloud information, which is information about a disposition of objects in the real world, generating a model representing the recognized geometric shape, and then converting the generated model into model information such as CAD (Computer Aided Design) data.

Further, Patent Literature 2 discloses a technology in which: a 3D model of an object in a real space is disposed in a 3D space; an omnidirectional image taken from a predetermined shooting position is mapped onto a cylindrical virtual screen; and the virtual screen is disposed in a virtual 3D space and image data for displaying the virtual 3D space in an elevated view from above is generated, so that the omnidirectional image is disposed in the virtual 3D space in an easily-recognizable manner.

It should be noted that, in recent years, there has been a growing demand for reproducing environmental information of the real-world on a 3D model in a computer simulation. For example, in recent years, robots such as AGVs (Automated Guided Vehicles) and vertical articulated robots have been increasingly used in factories and warehouses. When robots are introduced, in order to ensure safety and maximize the operational efficiency, it is necessary to consider beforehand the influence of such introduction of robots on a building where the robots will be installed and on the layout of other apparatuses in the building. This is because, when robots are introduced, it not only takes a long time to make improvements to their arrangement and layout while operating them in the actual environment, but also may lead to a temporary suspension of the operations. As means for examining information about such an environment in advance, efforts have been being made to reproduce operating states of robots and environmental information of the real world in a simulation.

CITATION LIST

Patent Literature

Patent Literature 1: Published Japanese Translation of PCT International Publication for Patent Application, No. 2000-509150

Patent Literature 2: International Patent Publication No. WO2017/017790

SUMMARY OF INVENTION

Technical Problem

In order to reproduce environmental information of the real-world in these robot simulators, it is necessary to, in addition to the modeling of objects to be reproduced, take physical characteristics in the disposition of the objects into consideration. Note that the physical characteristics mainly refer to information such as gravity and friction. By taking the physical characteristics into consideration, it is possible to reproduce the effects of contact, collision, and the like between a robot and an object, or between objects, and thereby to implement a more precise simulation. In addition, most of the information obtained by performing sensing in the real world contains errors from the real world. Therefore, if objects are simply disposed as they are based on information containing errors, the physical characteristics are ignored, thus making it difficult to perform a precise simulation.

However, neither Patent Literature 1 nor Patent Literature 2 discloses details of any technique for taking physical characteristics in the disposition of objects into consideration.

The present invention has been made in order to solve the above-described problem. An object of the present invention is to provide a model generation apparatus, a model generation system, a model generation method, and a program capable of generating a model for implementing a more precise simulation.

Solution to Problem

A model generation apparatus configured to generate a 3D model from 3D image information according to a first aspect of the present disclosure includes:

object extracting means for extracting an object to be reconstructed on the 3D model from the 3D image information, and acquiring, from among a plurality of object models available on the 3D model, an object model having a highest shape conformity degree with the object while associating the object model with size information and disposed-place information of the object;

model editing means for editing the acquired object model so that the object model conforms with the size information of the object; and model disposing means for disposing the edited object model on the 3D model so that the object model satisfies a physical constraint on the 3D model and conforms with the disposed-place information.

A model generation system configured to generate a 3D model from 3D image information according to a second aspect of the present disclosure includes:

object extracting means for extracting an object to be reconstructed on the 3D model from the 3D image information, and acquiring, from among a plurality of object models available on the 3D model, an object model having a highest shape conformity degree with the object while associating the object model with size information and disposed-place information of the object;

model editing means for editing the acquired object model so that the object model conforms with the size information of the object; and model disposing means for disposing the edited object model on the 3D model so that the object model satisfies a physical constraint on the 3D model and conforms with the disposed-place information.

A model generation method for generating a 3D model from 3D image information according to a third aspect of the present disclosure includes:

extracting an object to be reconstructed on the 3D model from the 3D image information, and acquiring, from among a plurality of object models available on the 3D model, an object model having a highest shape conformity degree with the object while associating the object model with size information and disposed-place information of the object;

editing the acquired object model so that the object model conforms with the size information of the object; and disposing the edited object model on the 3D model so that the object model satisfies a physical constraint on the 3D model and conforms with the disposed-place information.

A program according to a fourth aspect of the present disclosure causes a computer to perform:

a process for extracting an object to be reconstructed on the 3D model from the 3D image information, and acquiring, from among a plurality of object models available on the 3D model, an object model having a highest shape conformity degree with the object while associating the object model with size information and disposed-place information of the object;

a process for editing the acquired object model so that the object model conforms with the size information of the object; and a process for disposing the edited object model on the 3D model so that the object model satisfies a physical constraint on the 3D model and conforms with the disposed-place information.

Advantageous Effects of Invention

According to the present disclosure, it is possible to provide a model generation apparatus, a model generation system, a model generation method, and a program capable of generating a model for implementing a more precise simulation.

BRIEF DESCRIPTION OF DRAWINGS

FIG. 3 is a table showing an example of information stored in a model group database 15 according to the second example embodiment of the present disclosure;

FIG. 7 is a table showing an example of output data from object extraction means 11 according to the second example embodiment of the present disclosure;

FIG. 8 is a table showing an example of output data from model editing means 12 according to the second example embodiment of the present disclosure;

FIG. 11 is a table showing an example of information stored in a parameter database 17 according to the third example embodiment of the present disclosure;

FIG. 14 is a table showing an example of information stored in a model group database 15b according to the fourth example embodiment of the present disclosure.

EXAMPLE EMBODIMENTS

Specific example embodiments according to the present disclosure will be described hereinafter with reference to the drawings. Note that the drawings and specific configurations used in the example embodiments should not be used to interpret the invention.

First Example Embodiment

A configuration of a model generation apparatus according to the first example embodiment of the present disclosure will be described hereinafter with reference to the drawings.

Figure 1:
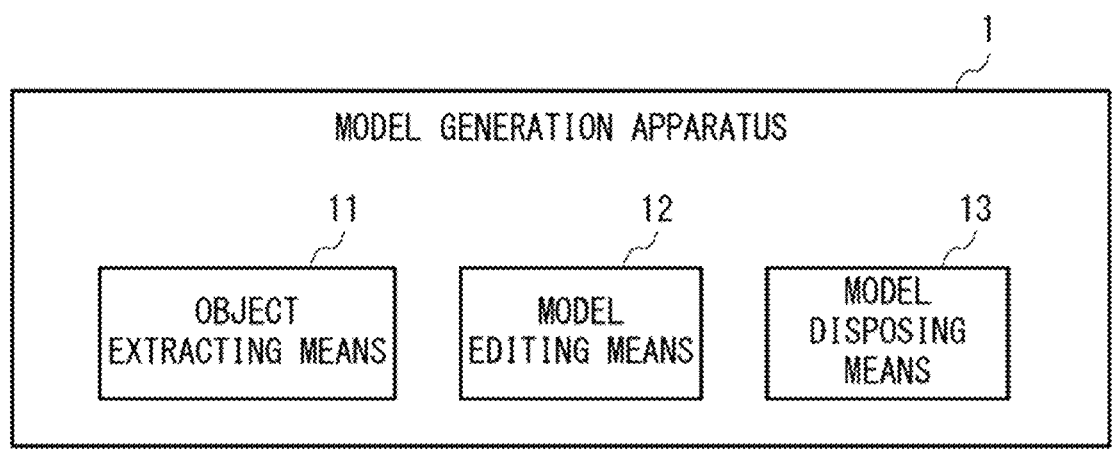
FIG. 1 is a block diagram showing a configuration of a model generation apparatus 1 according to a first example embodiment of the present disclosure.

FIG. 1 is a block diagram showing a configuration of a model generation apparatus 1 according to the first example embodiment of the present disclosure.

The model generation apparatus 1 includes object extraction means 11, model editing means 12, and model disposing means 13.

The object extraction means 11 extracts an object to be reconstructed on a 3D model from three-dimensional (3D) image information, and also acquires, from among a plurality of object models available on the 3D model, an object model having the highest shape conformity degree with the object while associating the object model with size information and disposed-place information of the object.

The model editing means 12 edits the extracted object model so that it conforms with the size information of the object acquired by the object extraction means 11.

The model disposing means 13 disposes the object model edited by the model editing means 12 on the 3D model so that the object model satisfies physical constraints on the 3D model and conforms with the disposed-place information acquired by the object extraction means 11.

The model generation apparatus 1 configured as described above operates, for example, as follows. Firstly, the model generation apparatus 1 extracts an object to be reconstructed on a 3D model from 3D image information through the operation of the object extraction means 11, and also acquires, from among a plurality of object models available on the 3D model, an object model having the highest shape conformity degree with the object while associating the object model with size information and disposed-place information of the object. Next, the following procedures are performed for each of extracted objects by the model editing means 12 and the model disposing means 13. That is, the model editing means 12 edits the acquired object model so that it conforms with the size information of the object extracted by the object extraction means 11. Then, the model disposing means 13 disposes the object model edited by the model editing means 12 on the 3D model so that the object model satisfies physical constraints on the 3D model and conforms with the disposed-place information acquired by the object extraction means 11.

Through the above-described configuration and operations, the model generation apparatus 1 according to the first example embodiment of the present disclosure can reproduce effects of contact, collision, and the like between objects, and can generate a 3D model with which a more precise simulation can be carried out. That is, when an object model extracted from 3D image information is disposed on a 3D model, it is possible to determine details of the disposition of the object model based on physical constraints in a plurality of adjacent object models. Therefore, it is possible to eliminate the possibility of a disposition of an object model which is physically impossible on the 3D model but which would otherwise occur due to an error or the like contained in the 3D information. In this way, it is possible to generate a 3D model with which a more precise simulation, in which effects of contact, collision, and the like between objects are reproduced, can be carried out.

Second Example Embodiment

Next, a configuration and operations of a model generation apparatus 1 according to a second example embodiment of the present disclosure will be described hereinafter with reference to the drawings. Note that descriptions of a configuration and operations similar to those of the model generation apparatus 1 according to the first example embodiment are omitted.

In the second example embodiment, operations performed by the model generation apparatus 1 according to the first example embodiment will be described in detail.

Figure 2:
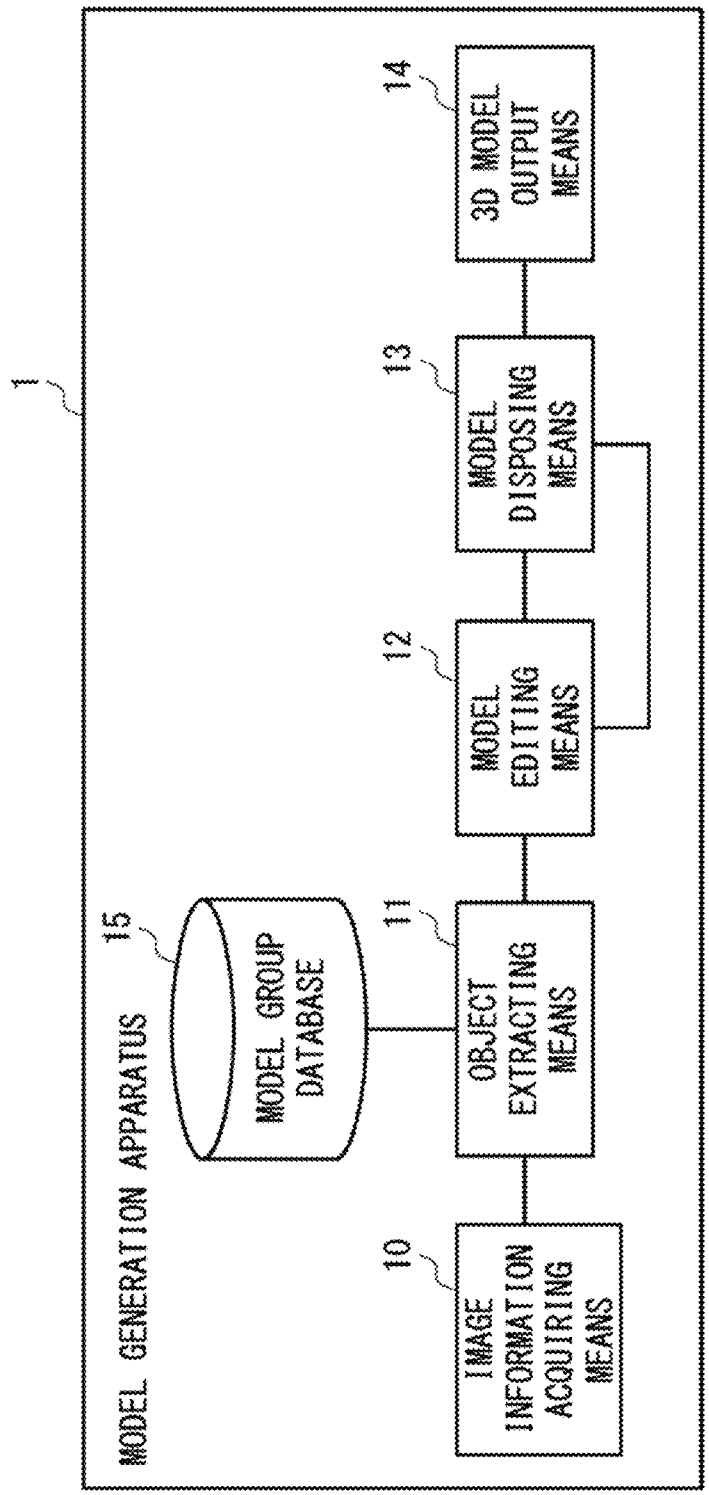
FIG. 2 is a block diagram showing a configuration of a model generation apparatus 1 according to a second example embodiment of the present disclosure.

The configuration of the model generation apparatus 1 according to the second example embodiment of the present application will be described with reference to the drawings. FIG. 2 is a block diagram showing the configuration of the model generation apparatus 1 according to the second example embodiment of the present disclosure. The model generation apparatus 1 includes image information acquiring means 10, object extracting means 11, model editing means 12, model disposing means 13, 3D model output means 14, and model group database 15. The object extracting means 11, the model editing means 12, and the model disposing means 13 are similar to those according to the first example embodiment, and therefore their descriptions will be omitted.

The image information acquiring means 10 acquires 3D image information, which is information three-dimensionally representing the presence of objects in a real space, from real-space sensing information. Specific examples of the 3D image information include Point Cloud information. Further, regarding the real-space sensing information, the image information acquiring means 10 may further include sensing means such as a depth camera, a 3D camera, or 3D LiDAR (Light Detection and Ranging), and acquire the real-space sensing information from the sensing means, or may acquire the real-space sensing information from an external apparatus.

The 3D model output means 14 outputs, as its data, a 3D model generated through the object extracting means 11, the model editing means 12, and the model disposing means 13.

Examples of data formats for the 3D model include COLLADA (Collaborative Design Activity), FBX (Filmbox), and 3DS (3D Studio).

The model group database 15 is a database in which a group of candidates for object models that can be used on the 3D model output by the model generation apparatus 1 is stored. The object model is data that defines the shape and the size of an object, for example, data expressed in a wire frame model, a polygon mesh, or a point cloud. The model group database 15 is referred to by the object extracting means 11 when it determines by which object model the object to be reconstructed on the 3D model is replaced.

FIG. 3 is a table showing an example of information stored in the model group database 15 according to the second example embodiment of the present disclosure. In the model group database 15, model names and object model information are stored while being associated with each other. In this example, file paths at which data of object models are stored are stored as the object model information. Object model data can be acquired by referring to a file path indicated in the object model information stored in the model group database 15.

Figure 4:
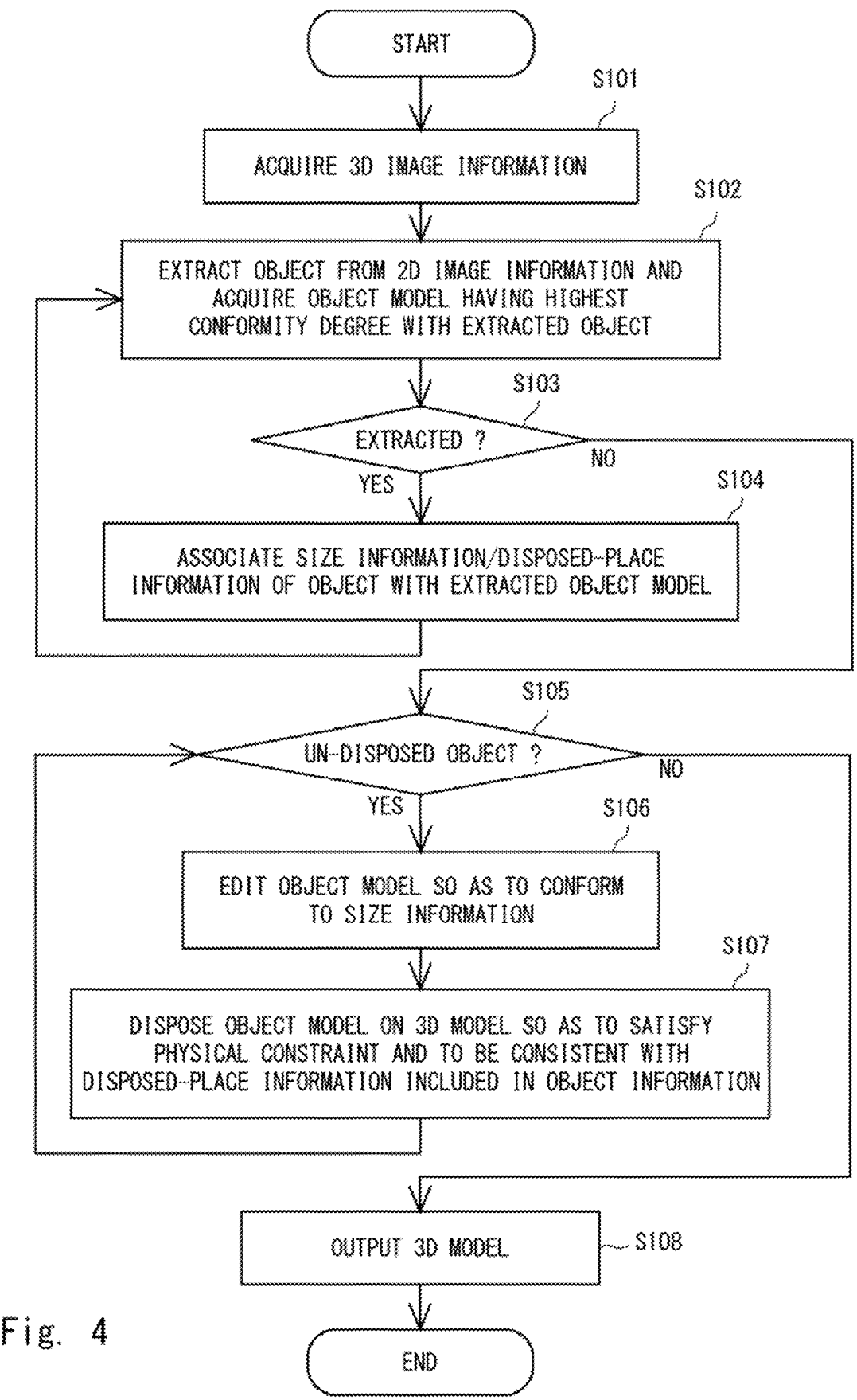
FIG. 4 is a flowchart showing operations performed by the model generation apparatus 1 according to the second example embodiment of the present disclosure.

Next, operations performed by the model generation apparatus 1 according to the second example embodiment of the present disclosure will be described with reference to FIG. 4. FIG. 4 is a flowchart showing operations performed by the model generation apparatus 1 according to the second example embodiment of the present disclosure.

Firstly, as an operation of the image information acquiring means 10, the model generation apparatus 1 acquires 3D image information (Step S101).

Figure 5:
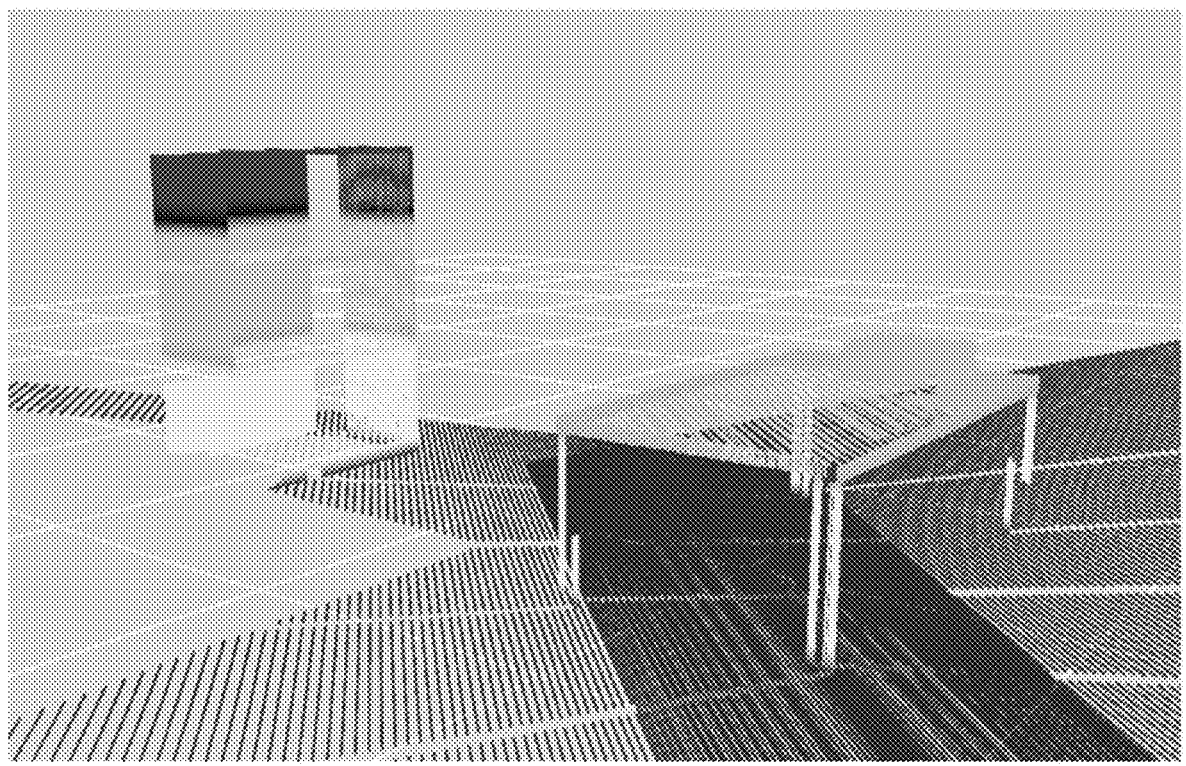
FIG. 5 shows an example of 3D image information according to the second example embodiment of the present disclosure.

An example of 3D image information acquired by a camera or the like will be described hereinafter with reference to FIG. 5. FIG. 5 shows an example of 3D image information in the second example embodiment of the present disclosure. In this example embodiment, for example, 3D image information is acquired by performing real-space sensing through a depth camera and converting a result of the sensing into point-cloud information. In the 3D image information shown in FIG. 5, a desk, luggage disposed on the desk, and a shelf are shown. Note that although the depth camera is used as the image information acquiring means 10 in this example, it is not limited to the depth camera. That is, the image information acquiring means 10 may be an ordinary camera including an image sensor, a wide-angle camera, or an RGBD camera that takes a color image and a range image, or two or more of these cameras may be used in combination.

The description of the operation is continued by referring to FIG. 4 again. Next, the object extracting means 11 extracts an object to be reconstructed on a 3D model from the acquired 3D image information, and acquires, from among a plurality of object models stored in the model group database 15, an object model having the highest shape conformity degree with the object (step S102). For example, as a specific example of the method for acquiring an object model, the object extracting means 11 performs a matching process between each of the object models stored in the model group database 15 and each of the objects included in the 3D image information, and thereby extracts a pair whose conformity degree is larger than a predetermined value as an object model. Note that the object extracting means 11 may be equipped with a known image recognition function.

Figure 6:
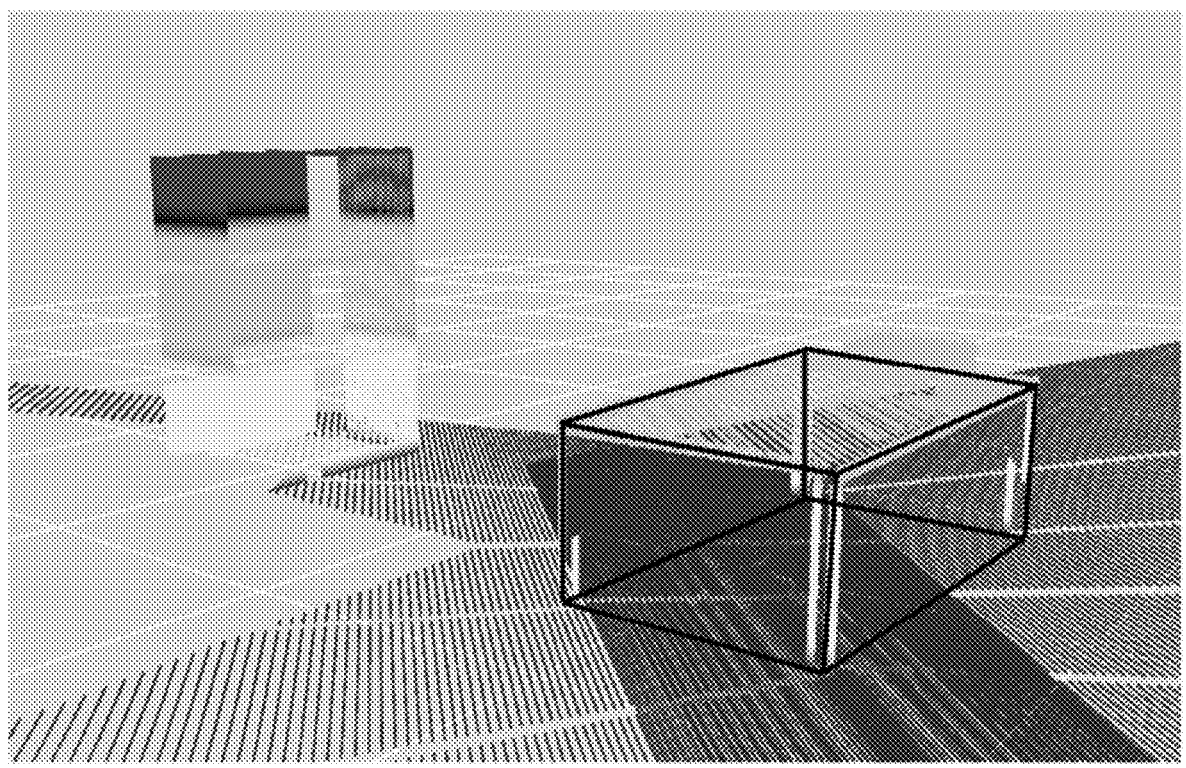
FIG. 6 shows an example of extraction of an object according to the second example embodiment of the present disclosure.

An example of the extraction of an object from 3D image information will be described hereinafter with reference to FIG. 6. FIG. 6 shows an example of the extraction of an object in the second example embodiment of the present disclosure. Based on the model group database 15 shown in FIG. 3, a range having a high conformity degree with a desk (indicated by black lines in FIG. 6) is extracted as an object from the 3D image information. Further, at this point, an object model of a desk is acquired as an object model having a high conformity degree with the shape of the object while being associated therewith.

The description of the operation is continued by referring to FIG. 4 again. When an object model can be extracted (YES in Step S103), size information and disposed-place information of the object are associated with the extracted object model (step S104). The size information of the object has a value by which the size of the object is uniquely expressed. As a specific example, values of a width, a depth, and a height of the object when the object is represented by a rectangle oriented at an angle conforming to that of the object model are acquired. Further, the disposed-place information has a value by which the location and the orientation of the object on the 3D model are uniquely expressed. As a specific example, a value of the center point of the object in a 3D orthogonal coordinate system in which a given point is used as the origin, and each of values of a roll, a pitch, and a yaw of the object in the orthogonal coordinate system are acquired. After the operation, the process returns to the step S102, and the processes are repeated until no other object can be extracted.

Operations performed by the object extracting means 11 will be described hereinafter in detail with reference to FIG. 7. FIG. 7 is a table showing an example of output data from the object extracting means 11 according to the second example embodiment of the present disclosure. As shown in FIG. 7, the object extracting means 11 extracts each of three points, i.e., each of a desk, luggage, and a shelf as an object to be reconstructed on the 3D model based on the model group database 15 shown in FIG. 3 and the 3D image information shown in FIG. 5. Further, file path information acquired from the model group database 15 is acquired as the 3D model information of each of the objects, and the width, depth, and height of each of the objects are acquired as the size information of the object. Further, information indicating X, Y, and Z coordinates of the center point of each of the objects, and a roll, a pitch, and a yaw of each of the objects when the object is reflected (i.e., reconstructed) on the 3D model are acquired as the disposition information. Further, these information items are associated with each other.

The description of the operation is continued by referring to FIG. 4 again. When no other object can be extracted (NO in Step S103), it is considered that the extraction of objects has been completed, and for each of the detected objects, the object model is edited and disposed on the 3D model.

Firstly, when there is a detected object that has not yet been disposed in the 3D model (YES in Step S105), the model editing means 12 edits the object model so that it conforms to the size information of the object included in the output data from the object extracting means 11 (step S106). Specifically, for example, for each of the object models, magnification ratios for an enlargement/contraction process for that object model are obtained by comparing a size that is defined in advance for that object model with the size information included in the output data from the object extracting means 11.

Operations performed by the model editing means 12 will be described hereinafter in detail with reference to FIG. 8. FIG. 8 is a table showing an example of output data from the model editing means 12 according to the second example embodiment of the present disclosure. Here, attention is paid to an object having ID=1 (a row in which data is underlined in the table). Then, magnification ratios are set based on the size information of the object. Here, assumed that, for example, the original 3D model has a width of 1 m, a depth of 50 cm, and a height of 1 m. Meanwhile, assume that the extracted object has a width of 1 m, a depth of 50 cm, and a height of 40 cm. Then, the magnification ratios are set to 1 for the width, 1 for the depth, and 0.4 for the height, respectively. Based on the size information (e.g., magnification ratios or contraction ratios) set as describe above, the model editing means 12 can edit the size of the object model.

Next, the model disposing means 13 disposes the object model on the 3D model (Step S107). Note that the object model is disposed so that it satisfies physical constraints on the 3D model and conforms with the disposed-place information included in the object information.

Note that the physical constraints mean, in addition to interference between objects, spatial disposition conditions determined by physical properties applied to the object, such as gravity, friction, and inertia. In the operations for acquiring 3D image information, it is rare to be able to sense the real world without causing any errors, and in most cases, there are measurement errors or processing errors from the real world. In order to construct a 3D model that is close to the real environment and conforms with physical constraints in a simulation, the 3D image information is corrected based on the physical constraints when the object model is disposed.

Even when each of the objects is disposed on the 3D model based on the data shown in FIG. 8, the following two physical constraints cannot be satisfied, and as a result, the environment of the real-world cannot be accurately reproduced. The first point is that the desk is disposed in a position where it floats above the floor. In the reality, the desk cannot be disposed as described above due to the presence of gravity. Therefore, it is necessary to correct the position of the desk, in particular a value of a Z-coordinate, and those of a roll and a pitch, so that each of the legs of the desk is in contact with the floor.

The second point is that the luggage disposed on the desk is interfering with the top board of the desk. Both the desk and the luggage are solid objects, so that the configuration in which one of them is embedded in the other violates the physical constraint. Further, since the luggage needs to be at a standstill on the desk, the luggage should not be disposed in a position where it floats above the desk as in the case of the above-described first point. Therefore, it is necessary to correct the position of the desk or the luggage so that the bottom surface of the luggage is in contact with the top board of the desk.

The model disposing means 13 according to this example embodiment can correct the size information and the disposed-place information of an object acquired from the 3D image information based on such physical constraints, and dispose each object model on the 3D model based on the corrected information.

Figure 9:
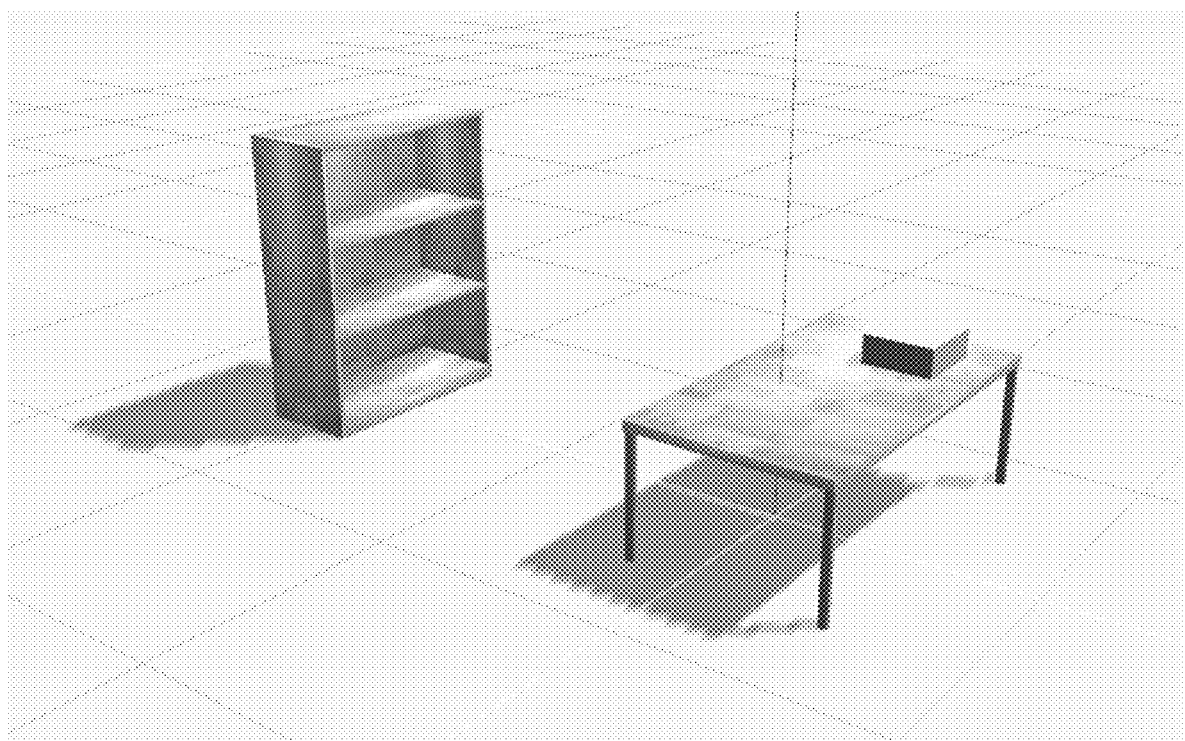
FIG. 9 shows an example of a 3D model after objects are disposed by operations performed by model disposing means 13 according to the second example embodiment of the present disclosure.

FIG. 9 shows an example of a 3D model after objects are disposed through the operations performed by model disposing means 13 according to the second example embodiment of the present disclosure. As shown in FIG. 9, it can be seen that the desk and the luggage are disposed so that the above-described two physical constraints are satisfied.

After disposing the object model, the process returns to the step S105, and the processes are repeated until there is no longer any object that has not yet been disposed. Then, when there is no longer any object that has not yet been disposed (NO in Step S105), the 3D model output means 14 outputs the created 3D model (step S108). After the output, the operation is completed.

Through the above-described configuration and operations, the model generation apparatus 1 can reproduce effects of contact, collision, and the like between objects in the real world, and can generate a 3D model with which a more precise simulation can be carried out. According to the present disclosure, an object to be reproduced on a 3D model is extracted from 3D image information, replaced by an object model and corrected, and then disposed on the 3D model so that the disposed object satisfies physical constraints.

Among these processes, in the extraction of the object and the replacement by the object model, an object model whose reference information such as a size is similar to features in the external appearance of the object is selected from a plurality of candidate object models prepared in advance. Therefore, it is possible to obtain information necessary to dispose the object on the 3D model and correct it during the disposition process without omission.

Further, the dimensions of the object model are corrected so that they conform with those in the size information of the object extracted from the 3D image information. Therefore, it is possible to make the physical parameters of the object model on the 3D model conform with those of the object in the 3D image information.

Lastly, the object model is disposed on the 3D model so that it conforms with the physical constraints thereon. In this process, position information containing errors obtained from the 3D image information is corrected by using information included in the object model. Therefore, the 3D model generated by the model generation apparatus 1 becomes a model that satisfies physical constraints such as contact between objects and gravity. Therefore, by using the 3D model output by the model generation apparatus 1 according to the present disclosure, it is possible to carry out a precise simulation in which the effects of physical constraints are taken into consideration.

Regarding the processing order of object models when a plurality of object models are disposed, they may be successively disposed starting with an object model closest to the floor surface. Specifically, for example, for each of the objects, the distance between a part of that object closest to the floor surface and the floor surface may be used as an index based on the size information and the disposition information included in the output information from the object extracting means 11, and the processing order of object models may be determined in ascending order of the indices.

Through the above-described configuration and operations, it is possible to improve the efficiency of the processing performed by the model disposing means 13. Since gravity needs to be taken into consideration as one of the physical constraints, the lower part of the object needs to have a stable surface, except for special cases such as hanging states. Therefore, by using the fact that the floor surface itself, which is the reference surface in the 3D model, satisfies the physical constraints, and by stably disposing the object models one by one starting with an object model closest to the floor surface, it is possible to achieve efficient processing. Therefore, it is possible to generate a 3D model at a higher speed.

Third Example Embodiment

Next, a configuration and operations of a model generation apparatus according to a third example embodiment of the present disclosure will be described with reference to the drawings. Note that descriptions of a configuration and operations similar to those of the model generation apparatuses according to the first and second example embodiments are omitted.

In the third example embodiment, operations performed by a model generation apparatus that can further acquire model parameter information, which is physical parameter information of an object, will be described in detail.

Figure 10:
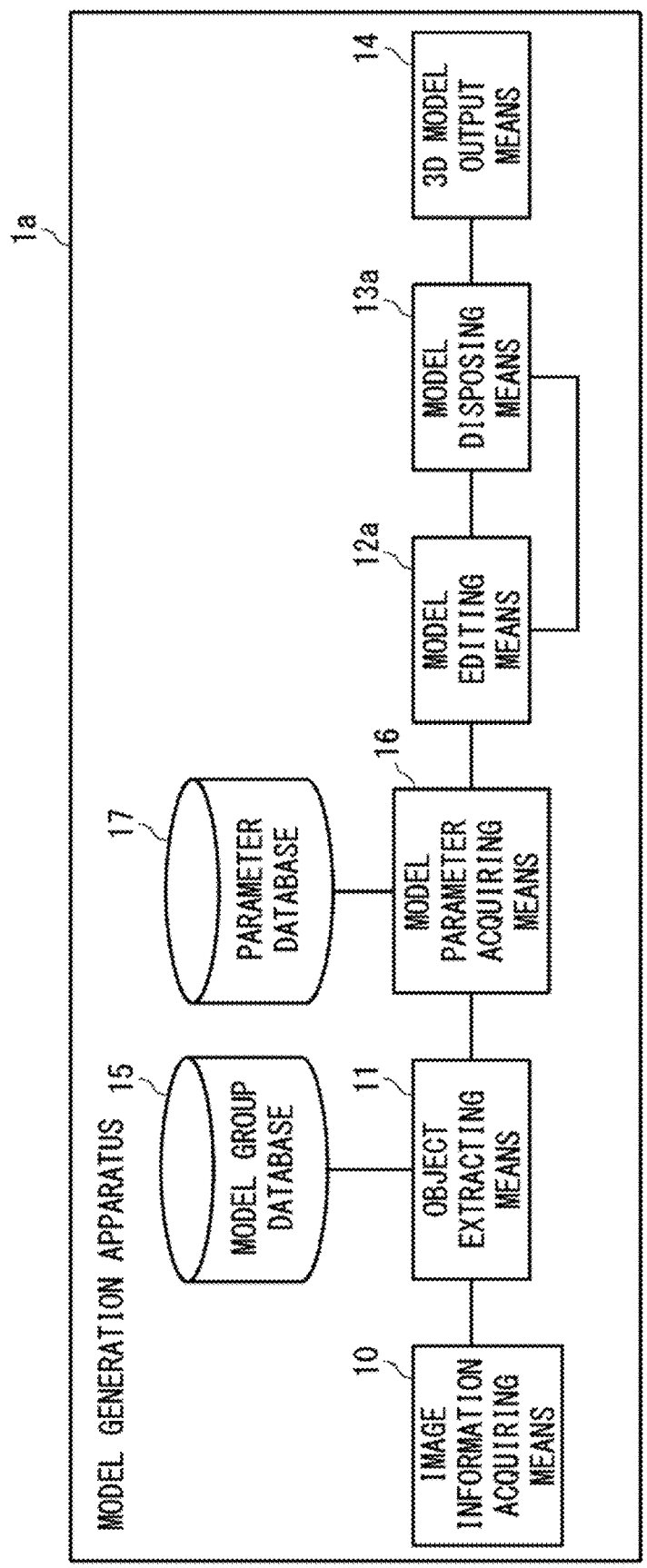
FIG. 10 is a block diagram showing an example of a configuration of a model generation apparatus 1a according to a third example embodiment of the present disclosure.

FIG. 10 is a block diagram showing an example of a configuration of a model generation apparatus 1a according to the third example embodiment of the present disclosure. The difference from the model generation apparatus according to the second example embodiment of the present disclosure is that the model generation apparatus 1a according to this example embodiment further includes model parameter acquiring means 16 and a parameter database 17, and that model editing means 12a and model disposing means 13a perform processing based on acquired model parameter information.

The model parameter acquiring means 16 obtains physical parameter information corresponding to an object model from the parameter database 17 based on information acquired from the object extracting means 11. Note that the physical parameter means numerical information related to a physical constraint set in the object model. Specific examples of the physical parameter include a mass and a friction coefficient on an object model surface.

The parameter database 17 is a database in which physical parameters for each of object models are stored. FIG. 11 is a table showing an example of information stored in the parameter database 17 according to the third example embodiment of the present disclosure. The mass is stored for each of the object models. Further, each of the parts (i.e., components) that constitute an object model, a dimension affected by the mass and the editing of the size of each part, a static friction coefficient, and a dynamic friction coefficient are also stored.

Figure 12:
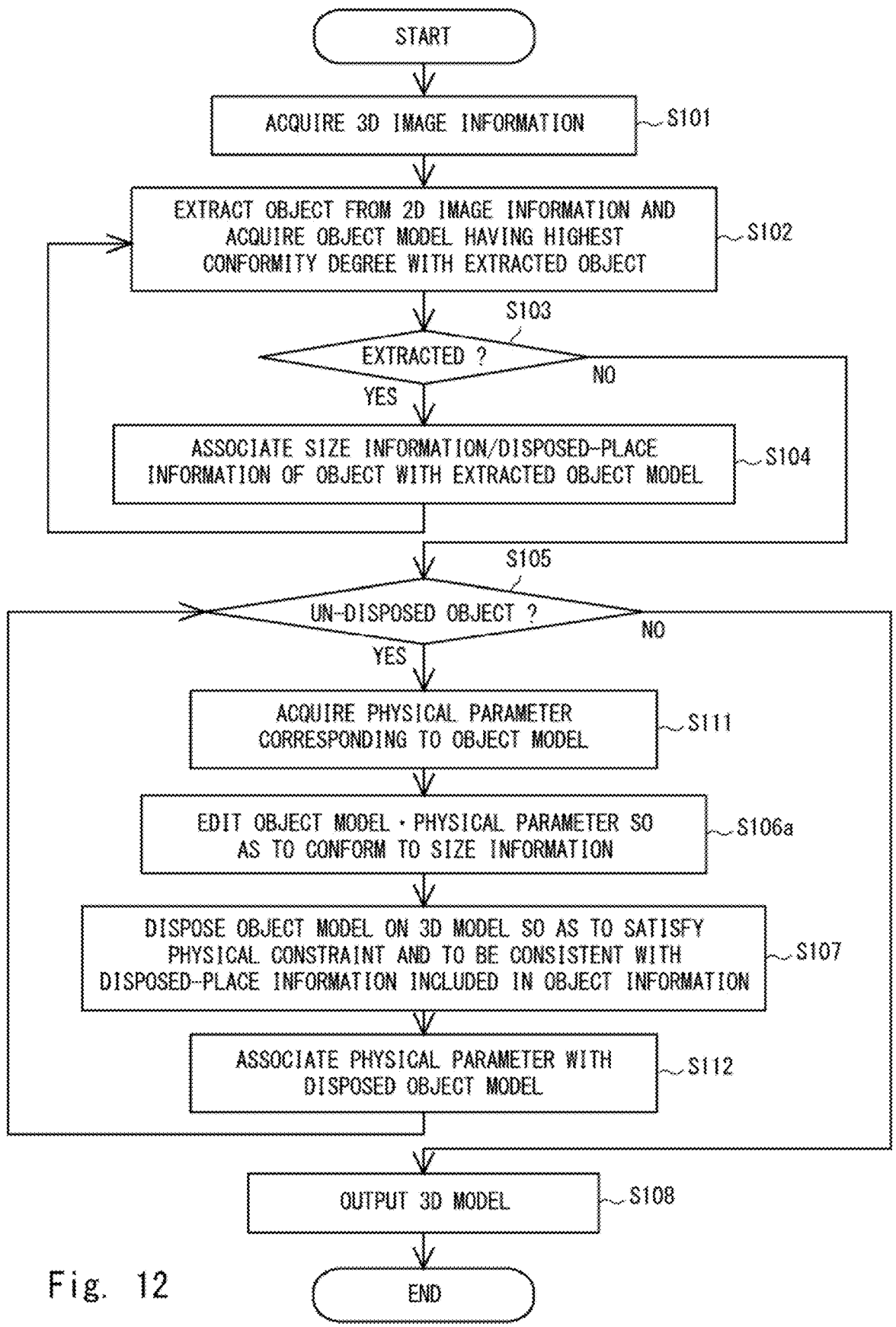
FIG. 12 is a flowchart showing operations performed by the model generation apparatus 1a according to the third example embodiment of the present disclosure.

Next, operations performed by the model generation apparatus 1a will be described in detail with reference to FIG. 12. FIG. 12 is a flowchart showing operations performed by the model generation apparatus 1a according to the third example embodiment of the present disclosure. Operations similar to those according to the second example embodiment of the present disclosure are indicated by the same numbers, and their descriptions are omitted as appropriate. Steps S101 to 104 are similar to those in the operations according to the second example embodiment of the present disclosure, and therefore their descriptions are omitted.

Based on the data output from the object extracting means 11, when there is an object that has not yet been disposed (YES in Step S105), the model parameter acquiring means 16 refers to the parameter database 17 and acquires physical parameters corresponding to the object model (step S111). For example, in the case where each information shown in FIG. 11 is stored in the parameter database 17, when the selected object model that has not yet disposed is a "desk", 5.5 kg is acquired as the mass, and 4.5 kg and 1.0 kg are acquired as the part-by-part masses of the top board and legs while being associated with the object model. Further, as dimensions affected by the editing of the size, for each of the width/depth and the height, 0.50 and 0.78 are acquired as static friction coefficients, and 0.47 and 0.71 are acquired as dynamic friction coefficients while being associated with the object model.

Next, the model editing means 12a edits the object model and the physical parameters so that they conform to the size information included in the output data from the object extracting means 11 (Step S106a). Since the editing of the object model is the same as the operation in the second example embodiment, the description thereof is omitted. As for the editing of physical parameters, for example, mass information is edited based on the magnification-ratio information obtained by the editing operation of the object model. Specifically, assume that, for example, the magnification ratios of the desk are 1 for the width, 1 for the depth, and 0.4 for the height, respectively. In this case, the mass of the top board is affected by the width and depth, and the mass of the leg is affected by the height. Therefore, the mass of the top board is expressed as 4.5 kg×1×1=4.5 kg, and the mass of the leg is expressed as 1 kg×0.4=0.4 kg.

Then, the model disposing means 13a disposes an object model on the 3D model (Step S107, since it is similar to that in the second example embodiment, the description thereof is omitted), and associates the acquired physical parameters with the disposed object (Step S112). Specifically, the 3D model data is edited, and the physical property values of the object model are set to the acquired physical parameter values. After the process has been carried out for one object model, the process returns to the Step S105. When there is an object that has not yet been disposed (YES in Step S105), similar processes are repeated.

Through the above-described configuration and operations, it is possible to reproduce effects of contact, collision, and the like between objects, and thereby to generate a 3D model with which a more precise simulation can be carried out. According to the present disclosure, physical parameters that are set for each object model can be set in the 3D model. As a result, it is possible to generate a 3D model suitable for a precise simulation.

Further, even when the size of the object changes from an environment (3D image information) to another, the physical parameters can be appropriately edited according to the size of the object while taking into account the magnification ratio for each dimension of the width, depth, and height, and the effect of the magnification ratio for each dimension. As a result, it is possible to generate a 3D model with which a more precise simulation can be carried out.

Fourth Example Embodiment

Next, a configuration and operations of a model generation apparatus according to a fourth example embodiment of the present disclosure will be described with reference to the drawings. Note that descriptions of a configuration and operations similar to those of the model generation apparatuses according to the first to third example embodiments are omitted.

In the fourth example embodiment, operations performed by a model generating apparatus capable of extracting an object model based on disposition constraints between object models will be described in detail. Note that disposition constraints mean constraints imposed on the disposition of an object model of interest by the disposition of another object model(s). For example, in general, it is difficult to conceive that a chair is disposed on a desk. According to this idea, it is possible to eliminate the possibility that an object disposed on a desk is a chair. Therefore, it is possible to omit (e.g., skip) a matching process with an object model of a chair when the object is extracted, and thereby to reduce the time required for the extraction of the object.

Figure 13:
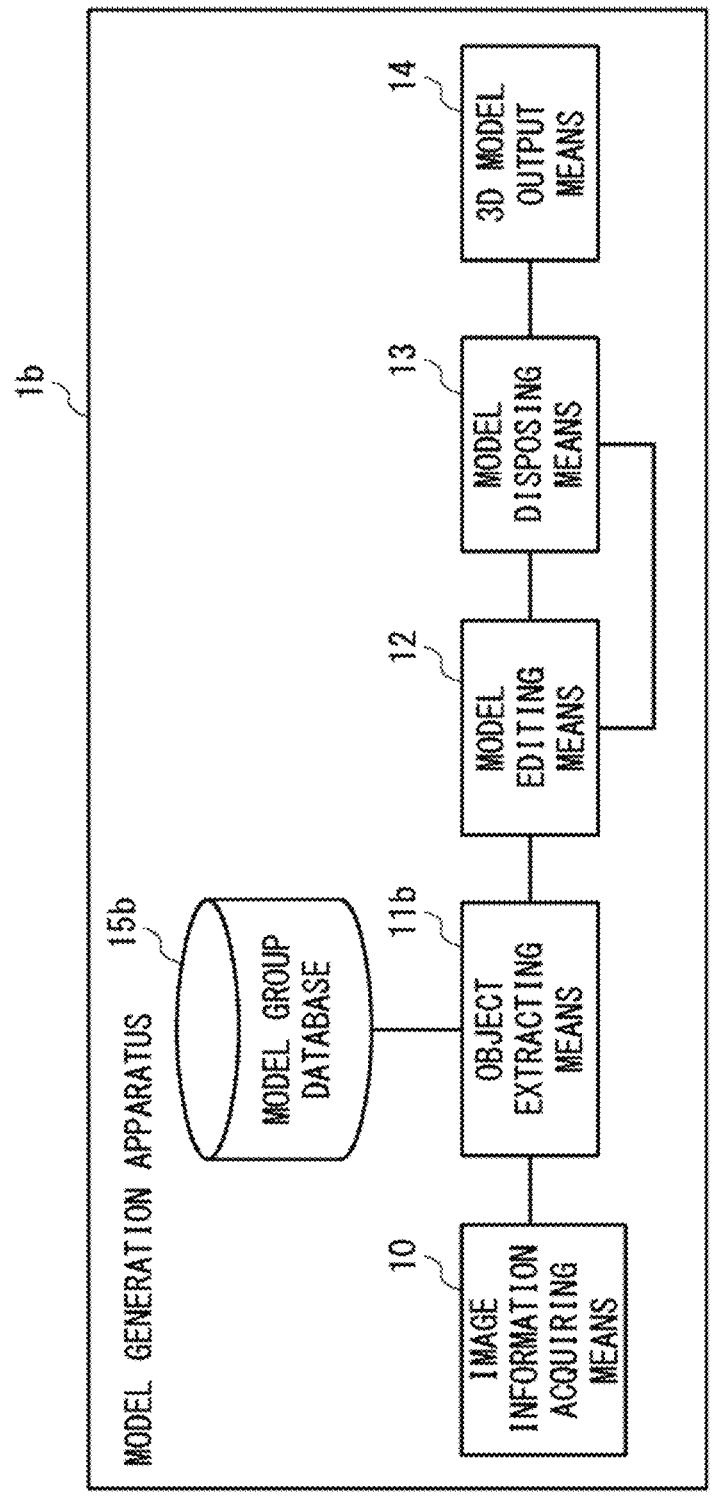
FIG. 13 is a block diagram showing a configuration of a model generation apparatus 1 according to the fourth example embodiment of the present disclosure.

FIG. 13 is a block diagram showing a configuration of a model generation apparatus 1b according to the fourth example embodiment of the present disclosure. The difference from the model generation apparatus according to the second example embodiment of the present disclosure is that, in the model generation apparatus 1b according to this example embodiment, a model group database 15b further holds information related to disposition constraints between object models, and the object extracting means 11b extracts an object model based on the disposition constraints between object models.

The object extracting means 11b extracts an object to be reconstructed on a 3D model from 3D image information, and also acquires, from among a plurality of object models stored in the model group database 15b, an object model having the highest shape conformity degree with the object. Note that the object model is extracted based on the disposition constraints between object models. Then, size information and disposed-place information of the object are acquired while being associated therewith.

FIG. 14 is a table showing an example of information stored in the model group database 15b according to the fourth example embodiment of the present disclosure. In addition to the model name and the 3D model information, lower-part disposition constraints are stored in the model group database 15b while being associated therewith. In this example, as the lower-part disposition constraints, object models that are permitted to be disposed in the lower part of the object model are stored. For example, "(base)" is stored in the lower-part disposition constraints of the desk. Note that (base) refers to a reference surface (e.g., a floor surface). That is, according to the model group database 15b according to this example embodiment, it is specified that "a desk is disposed only on the reference surface".

Through the above-described configuration and operations, it is possible to reduce the time required for the extraction of the object. Based on the disposition relation among a plurality of objects, it is possible to omit (e.g., skip) some of the processes for conforming an object to an object model performed by the object extracting means 11. Therefore, it is possible to generate a 3D model at a higher speed.

Although example embodiments according to the predetermined have been explained above with reference to the drawings, the specific configurations are not limited to those described above, and various design modification can be made thereto within the scope and spirit of the present invention. For example, the functions constituting the model generation apparatus may be configured and operated by a plurality of apparatuses connected through a network.

Further, a program for implementing all or some of the functions of the model generation apparatus in the present disclosure may be recorded on a computer readable recording medium, and the program recorded on the recording medium may be loaded into a computer system and executed thereby, so that the processing of each unit is performed. Note that the term "computer system" here includes hardware such as an OS and peripheral devices.

Further, the "computer readable recording medium" means a portable medium such as a magneto-optical disk, a ROM, or a non-volatile semiconductor memory, or a storage device such as a hard disk drive provided inside the computer system. Further, "computer readable storage media" also includes those that dynamically hold a program for a short period of time, such as a communication line in the case where the program is transmitted through a network such as the Internet or a communication line such as a telephone line, and those that hold a program for a certain period of time, such as a volatile memory disposed inside a computer system that serves as a server or a client in that case. Further, the aforementioned program may be one for implementing some of the aforementioned functions, and may also be one that can implement the above-mentioned functions in combination with a program already recorded in the computer system.

Although the present disclosure has been described with reference to example embodiments, the technical scope of the present disclosure is not limited to the scope described in the above-described example embodiments. It is obvious to those skilled in the art that various modifications or improvements can be made to the above-described example embodiments. It is obvious, from the description of the claims, that such modifications or improvements may also be included in the technical scope of the present disclosure.

In the above-described examples, the program can be stored and provided to a computer using any type of non-transitory computer readable media. Non-transitory computer readable media include any type of tangible storage media. Examples of non-transitory computer readable media include magnetic storage media, optical magnetic storage media, CD-ROM (Read Only Memory), CD-R, CD-R/W, and semiconductor memories. Examples of the magnetic storage media include flexible disks, magnetic tapes, and hard disk drives. Examples of the semiconductor memories include mask ROM, PROM (programmable ROM), EPROM (Erasable PROM), flash ROM, and RAM (random access memory). Further, the program may be supplied to a computer by using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments, and they can be modified as appropriate without departing from the spirit and scope of the present disclosure. Further, the present disclosure may be implemented by combining two or more of the example embodiments as appropriate.

The whole or part of the example embodiments disclosed above can be described as, but not limited to, the following supplementary notes.

(Supplementary note 1)

A model generation apparatus configured to generate a 3D model from 3D image information, comprising:

object extracting means for extracting an object to be reconstructed on the 3D model from the 3D image information, and acquiring, from among a plurality of object models available on the 3D model, an object model having a highest shape conformity degree with the object while associating the object model with size information and disposed-place information of the object;

model editing means for editing the acquired object model so that the object model conforms with the size information of the object; and model disposing means for disposing the edited object model on the 3D model so that the object model satisfies a physical constraint on the 3D model and conforms with the disposed-place information.

(Supplementary note 2)

The model generation apparatus described in Supplementary note 1, wherein when the model disposing means disposes a plurality of object models, it successively disposes the plurality of object models starting with an object model closest to a floor surface.

(Supplementary note 3)

The model generation apparatus described in Supplementary note 1 or 2, further comprising model parameter acquiring means for acquiring physical parameter information corresponding to the acquired object model, wherein the model editing means further edits the physical parameter information according to the editing of the object model, and the model disposing means further disposes the edited object model so as to satisfy the physical constraint by associating the edited physical parameter with the edited object model.

(Supplementary note 4)

The model generation apparatus described in Supplementary note 3, wherein the physical parameter information includes mass information and friction information.

(Supplementary note 5)

The model generation apparatus described in any one of Supplementary notes 1 to 4, wherein the object extracting means further acquires an object model based on a constraint condition associated with the plurality of object models.

(Supplementary note 6)

The model generation apparatus described in Supplementary note 5, wherein the constraint condition includes a disposition constraint for the object model.

(Supplementary note 7)

The model generation apparatus described in any one of Supplementary notes 1 to 6, wherein the physical constraint include gravity.

(Supplementary note 8)

The model generation apparatus described in any one of Supplementary notes 1 to 7, wherein the 3D image information is point-cloud information.

(Supplementary note 9)

A model generation system configured to generate a 3D model from 3D image information, comprising:

object extracting means for extracting an object to be reconstructed on the 3D model from the 3D image information, and acquiring, from among a plurality of object models available on the 3D model, an object model having a highest shape conformity degree with the object while associating the object model with size information and disposed-place information of the object;

model editing means for editing the acquired object model so that the object model conforms with the size information of the object; and model disposing means for disposing the edited object model on the 3D model so that the object model satisfies a physical constraint on the 3D model and conforms with the disposed-place information.

(Supplementary note 10)

A model generation method for generating a 3D model from 3D image information, comprising:

extracting an object to be reconstructed on the 3D model from the 3D image information, and acquiring, from among a plurality of object models available on the 3D model, an object model having a highest shape conformity degree with the object while associating the object model with size information and disposed-place information of the object;

editing the acquired object model so that the object model conforms with the size information of the object; and disposing the edited object model on the 3D model so that the object model satisfies a physical constraint on the 3D model and conforms with the disposed-place information.

(Supplementary note 11)

A non-transitory computer readable medium storing a program for causing a computer to perform:

a process for extracting an object to be reconstructed on the 3D model from the 3D image information, and acquiring, from among a plurality of object models available on the 3D model, an object model having a highest shape conformity degree with the object while associating the object model with size information and disposed-place information of the object;

a process for editing the acquired object model so that the object model conforms with the size information of the object; and a process for disposing the edited object model on the 3D model so that the object model satisfies a physical constraint on the 3D model and conforms with the disposed-place information.

Note that the present disclosure is not limited to the above-described example embodiments, and they may be modified as appropriate without departing from the scope and spirit of the disclosure.

REFERENCE SIGNS LIST

1 MODEL GENERATION APPARATUS
10 IMAGE INFORMATION ACQUIRING MEANS
11 OBJECT EXTRACTING MEANS
12 MODEL EDITING MEANS
13 MODEL DISPOSING MEANS
14 3D MODEL OUTPUT MEANS
15 MODEL GROUP DATABASE
16 MODEL PARAMETER ACQUIRING MEANS
17 PARAMETER DATABASE

What is claimed is:

1. A model generation apparatus configured to generate a 3D model from 3D image information, comprising:
at least one memory storing instructions, and
at least one processor configured to execute the instructions to:
extract an object to be reconstructed on the 3D model from the 3D image information, and acquire, from among a plurality of object models available on the 3D model, an object model having a highest shape conformity degree with the object while associating the object model with size information and disposed-place information of the object;
edit the acquired object model so that the object model conforms with the size information of the object; and
dispose the edited object model on the 3D model so that the object model satisfies a physical constraint on the 3D model such that the object model is disposed in a position at which the object model does not float above a floor or other object models near the floor, or the object model does not interfere with the other object models, and conforms with the disposed-place information,
wherein the plurality of object models are successively disposed starting with the object model closest to the floor.

2. The model generation apparatus according to claim 1, wherein the at least one processor is configured to execute the instructions to further:
acquire physical parameter information corresponding to the acquired object model; and edit the physical parameter information according to editing of the object model, wherein
the edited object model is disposed so as to satisfy the physical constraint by associating the edited physical parameter with the edited object model.

3. The model generation apparatus according to claim 2, wherein the physical parameter information includes mass information and friction information.

4. The model generation apparatus according to claim 1, wherein the object model is acquired based on a constraint condition associated with the plurality of object models.

5. The model generation apparatus according to claim 4, wherein the constraint condition includes a disposition constraint for the object model.

6. The model generation apparatus according to claim 1, wherein the physical constraint include gravity.

7. The model generation apparatus according to claim 1, wherein the 3D image information is point-cloud information.

8. A model generation system configured to generate a 3D model from 3D image information, comprising:
at least one memory storing instructions, and
at least one processor configured to execute the instructions to:
extract an object to be reconstructed on the 3D model from the 3D image information, and acquire, from among a plurality of object models available on the 3D model, an object model having a highest shape conformity degree with the object while associating the object model with size information and disposed-place information of the object;
edit the acquired object model so that the object model conforms with the size information of the object; and
dispose the edited object model on the 3D model so that the object model satisfies a physical constraint on the 3D model such that the object model is disposed in a position at which the object model does not float above a floor or other object models near the floor, or the object model does not interfere with the other object models, and conforms with the disposed-place information,
wherein the plurality of object models are successively disposed starting with the object model closest to the floor.

9. A model generation method for generating a 3D model from 3D image information, comprising:
extracting, by a processor, an object to be reconstructed on the 3D model from the 3D image information, and acquiring, from among a plurality of object models available on the 3D model, an object model having a highest shape conformity degree with the object while associating the object model with size information and disposed-place information of the object;
editing, by the processor, the acquired object model so that the object model conforms with the size information of the object; and
disposing, by the processor, the edited object model on the 3D model so that the object model satisfies a physical constraint on the 3D model such that the object model is disposed in a position at which the object model does not float above a floor or other object models near the floor, or the object model does not interfere with the other object models, and conforms with the disposed-place information,
wherein the plurality of object models are successively disposed starting with the object model closest to the floor.

* * * * *